United States Patent

[11] 3,583,754

| [72] | Inventor | Constantin Graf von Berckheim<br>Friedrechstrasse 9, 694 Weinheim an der Bergstrasse, Germany |
|---|---|---|
| [21] | Appl. No. | 744,540 |
| [22] | Filed | July 12, 1968 |
| [45] | Patented | June 8, 1971 |
| [32] | Priority | July 14, 1967, Nov. 7, 1967 |
| [33] | | Germany |
| [31] | | B 71,785 and P 16 30 187.4 |

[54] ELECTROSTATIC CONDITIONING OF AIR IN VEHICLES
17 Claims, 3 Drawing Figs.

[52] U.S. Cl. ................................................. 296/1, 55/140
[51] Int. Cl. .................................................. B62d 31/00
[50] Field of Search .................................... 55/101, 153, 140; 296/1, 91

[56] References Cited
UNITED STATES PATENTS

| 2,587,173 | 2/1952 | Landgraf | 55/153 |
| 3,421,290 | 1/1969 | Cheney | 55/101 |

*Primary Examiner*—Philip Goodman
*Attorney*—Michael S. Striker

ABSTRACT: A passenger conveyance, such as a motor vehicle, a boat, an airplane or the like has walls which enclose and define a passenger compartment. A roof structure is provided on the passenger compartment. An arrangement for establishing within the passenger compartment an electrostatic field is provided and includes first electrode means which is remote from the roof structure, and second electrode means including an electrically conductive element and an electrically insulating element which insulates the conductive element from the remainder of the wall means. At least one of these elements constitutes at least a portion of the roof structure of the conveyance.

Inventor:
CONSTANTIN GRAF VON BERCKHEIM

By: Michael S. Striker
Attorney

Inventor:
CONSTANTIN GRAF VON BERCKHEIM

By: Michael S. Striker
Attorney

ELECTROSTATIC CONDITIONING OF AIR IN VEHICLES

BACKGROUND OF THE INVENTION

The present invention relates generally to passenger conveyances, and more particularly to an arrangement for the electrostatic conditioning of air in such passenger conveyances.

The beneficial influence of an artificially established electrostatic field in an enclosed space upon the human organism has already been established. Arrangements for providing such electrostatic fields have heretofore been used in private homes, public buildings or the like, for treating the air in enclosed spaces of such structures. Such arrangements include ceiling electrodes which are in a suitable manner disposed below the ceiling of a room whose air is to be conditioned, and which are electrically insulated from the ceiling and the sidewalls of the room. A counterelectrode, usually arranged at or near the floor of the room, is provided and between these two electrodes an electrostatic field is established having the already known beneficial properties. The insulation provided, particularly for the ceiling electrode, is required to be very reliable because depending on the desired field strength in the room the ceiling electrode may be connected to a voltage ranging from several hundred to several thousand volts.

It has been recognized that the use of such an arrangement for establishing an electrostatic field would also be beneficial if applied to the passengers of passenger-carrying conveyance, particularly to the operator of the conveyance, such as the driver of an automobile. The general increase in alertness obtained in this manner would evidently be beneficial from various points of view, including the fact that it would reduce the likelihood of accidents resulting from tiredness and the like. However, attempts to incorporate such an arrangement in passenger conveyances, and particularly in automobiles where the roof is usually kept low for aerodynamic reasons so that there is relatively little space between the head of the passenger or operator and the inside of the roof, have not been successful until now. To transfer the type of arrangement used in rooms of homes, public buildings or the like into an automobile would require the roof of the automobile to be raised significantly. It should be noted that here reference will be had exclusively to automobiles for the sake of convenience, and the arrangement according to the present invention will be discussed with respect of its beneficial influence upon the operator of such an automobile. However, it is to be understood that any other type of passenger conveyance of the type having a passenger compartment, such as trucks, buses, ships, planes and generally any other types of passenger conveyance, can be similarly provided with the arrangement according to the present invention and are intended to be included wherever reference is hereafter had to an automobile, just as it will be clear that the beneficial influence of the arrangement according to the present invention will be applicable to passengers other than the vehicle operator.

In addition to the problems set forth above in conjunction with the provision of an arrangement for establishing an electrostatic field which have been encountered in vehicles, there is also the fact that the relatively insignificant space remaining between the head of the operator and the underside of the vehicle roof already contains a variety of components which are provided for various different purposes, for instance a layer of suitable material which is intended to dampen vibrations, a layer of shock-absorbing material, a liner of sheet material such as plastic foil, or the like. All of this of course cuts down even further on the available space and attempts at providing arrangements for establishing an electrostatic field in such conveyances have heretofore not been successful for these various reasons.

Accordingly, it is an object of the present invention to provide in a passenger conveyance an arrangement for establishing an electrostatic field in the passenger compartment of the conveyance.

More particularly, it is an object of the present invention to provide such an arrangement in a simple and inexpensive manner.

An additional object of the invention is to provide an arrangement of the type in question without the need for varying the height of the roof or the interior dimensions of the passenger compartment.

SUMMARY OF THE INVENTION

In pursuances of these objects, and others which will become apparent hereafter, one feature of my invention resides in providing, in a passenger conveyance of the type having wall means which encloses and defines a passenger compartment provided with a roof structure, an arrangement for establishing within the passenger compartment an electrostatic field. This arrangement comprises first electrode means which is remote from the roof structure, for instance located in the region of the floor of the passenger compartment or at another suitable point, and second electrode means which includes an electrically conductive element and an electrically insulating element which insulates the electrically conductive element from the remainder of the wall means. In accordance with the invention at least one of these elements constitutes at least a portion of the roof structure of the passenger conveyance.

With this construction I am able to utilize at least a portion of the already existing roof structure, that is of components which are provided in the vehicle in any case and for other purposes such as shock-absorbing purposes or the like, and thus to drastically decrease the space requirements for the second electrode means or ceiling electrode of my arrangement.

This not only results in a reduction in the space requirements, but also in a reduction of expenses involved. My arrangement can be either incorporated during the original construction of the vehicle, or it can be added at a later date. Advantageously, the roof structure of the vehicle may consist at least in part of electrically insulating material, that is at least a component of the roof structure which is provided in any case for other purposes, for instance for shock-absorbing purposes, may be constituted of material which provides the desired electrically insulating characteristics. It may then in turn carry the electrically conductive element of the second electrode means for which it will act as an insulator. This concept of having such a component perform this dual function is entirely novel in roof structures of vehicles.

The electrically conductive element itself may be provided in form of a large expanse covering or coating on a large expanse insulating element or portion. By large expanse as used in this context and hereafter I intend to indicate an extended surface area, such as for instance a portion of the underside of the actual roof, or the like. In such a construction the electrically conductive element may be a coating of electrically conductive material, or it may be a foil of such material. It can be extremely thin because the electrically insulating element, which is assumed to be an already existing component of the roof structure, will provide sufficient mechanical strength. With such an arrangement the space required for the second electrode means or ceiling electrode is reduced to zero for all intents and purposes.

In a currently preferred embodiment of the invention the roof construction or structure of the vehicle is of a known type which includes at least one component for absorbing sound, for absorbing shock, for preventing corrosion, for optical concealment or the like, and the second electrode means or ceiling electrode as it will hereafter be identified when reference is had to the electrically conductive element, will be suitably secured to the wall means of the passenger compartment through the intermediary of at least portions of this electrically insulating element of the roof structure. The existing component must, of course, be made from material having such electrically insulating characteristics that it will electrically insulate the roof electrode with reference to the wall means of the passenger compartment.

I have found that in the rather confined space of a passenger compartment a relatively small voltage is required for producing a sufficient field strength. This is so not only because the interior of the passenger compartment if relatively low, but also because the person or persons to be exposed to the electrostatic field will have his head and the upper part of his body located relatively close to the ceiling electrode with a resulting field strength concentration in the region of the head and the upper part of the body so that a sufficiently high field strength for the electrostatic field is obtained even if the voltage applied to the ceiling electrode is relatively low. This makes it possible to use a voltage on the order of approximately 100 volts and this, in turn, makes it possible to use for the known components of the roof structure which according to the present invention are to serve a double purpose as electrically insulating material, materials which need not meet particularly high insulating requirements. Thus, it is possible to use a great variety of different materials for this purpose, most of which are already known and used in vehicular construction in any case.

It is also advantageous if the electrically insulating element consists of a material, for instance a synthetic plastic material, which has been selected with a view to inhibiting its electrostatic charging. This may be accomplished by subjecting the material to a suitable treatment after its manufacture, or even by subjecting it to such treatment during the manufacture, for example by the incorporation of a suitable additive. The use of such a material prevents the insulating element from accumulating an electrostatic charge from the electrostatic field, and from administering a shock to a person touching the insulating element.

I have found it to be particularly advantageous if at least one layer arranged with spacing below the vehicle roof and constituting the roof liner, consists of electrically insulating material and carries the ceiling electrode. Here, again, it will be appreciated that the electrode may be provided at the upper side of the electrically insulating layer, that is the side facing the underside of the roof, so that the electrically insulating layer serves not only as an insulator but also to conceal the electrode. In such a construction it is sufficient for insulating the ceiling electrode from the conductive roof and the wall means generally which surrounds the passenger compartment, if the ceiling electrode terminates with some spacing from the areas of contact of the electrically insulating layer, that is the roof liner, with the wall means. As far as insulation between the ceiling electrode and the roof itself is concerned, an air space of between 0.5 and 2.0 cm., or a simple interposed layer of insulating material, has been found to be sufficient.

The electrically insulating element or layer may be constituted by a roof liner of electrically insulating synthetic plastic foil. On the other hand, it may be constituted in form of a roof liner consisting of a rigid or substantially rigid plate. Again, the roof liner may be configurated as an elastically deformable electrically insulating shell of synthetic plastic material which may be connected with a snap action to suitable connecting means provided on the roof or the sidewalls of the passenger compartment. In any of these cases the ceiling electrode can be readily installed because it is installed at the time when the roof liner is installed into the vehicle. If the roof liner is of the type which can be subsequently detached, then the electrode can be installed at any desired time after manufacture of the vehicle, and can also be removed for cleaning purpose whenever desired.

In the event that the roof liner is not detachable, then it is advantageous to provide at least one opening in the roof liner so as to gain access to the space between the same and the underside of the roof. Suitable closure means in form of a plate or flap consisting of the material of the roof liner, or of other material, can be provided for this opening and connecting means, such as for example a zipper, can be provided for holding this closure means to the remainder of the roof liner. The desirability of gaining access to the space between the roof liner and the underside of the roof results from the fact that dust accumulates on the upper side of the roof liner, that is the one which faces the underside of the roof, between the electrode and the underside of the roof and the accumulation of dust may disadvantageously influence the insulating characteristics. Such dust can be readily removed through an opening provided in accordance with the present invention. Furthermore, it is clear that such an opening can also serve to gain access to the components located intermediate the underside of the roof and the roof liner, for instance electrical conductors or the like.

A further embodiment of the invention envisions at least one layer of electrically insulating material provided at the underside of the vehicle roof and carrying in turn on its own underside, that is the side facing the interior of the passenger compartment, the ceiling electrode. Such a layer of insulating material may be a known layer of felt, foam plastic or the like which are incorporated in vehicle roof structures in any case, or a coating of antireverberation paste, corrosion-protective paint or lacquer, or the like.

In accordance with another embodiment of the invention at least a portion of the roof itself may consist of electrically insulating material and may carry at its underside facing the passenger compartment the ceiling electrode. In this case, as in any other cases where the ceiling electrode would be normally visible at the interior of the passenger compartment, it is advantageous to provide a suitable cover which conceals the electrode. Such cover, which will not noticeably influence the electrostatic field, may be very thin an may be solid or perforated.

A further embodiment of the invention envisions the provision of the ceiling electrode on the roof of the vehicle, with a layer of rust-preventive lacquer or paint interposed between the two. Such lacquer or paint is usually provided in roof structure of vehicles in any case, and it is only necessary in accordance with the present invention to use a type which is not only rust preventive but which also is electrically insulating. Such lacquers or paints are known.

A very advantageous embodiment of the invention comprises a roof liner located below the vehicle roof and consisting of a layer of sound-absorbent and/or shock-absorbent electrically insulating material, for instance foam plastic material, which layer is located below and closest to the underside of the vehicle roof, a ceiling electrode in form of an electrode foil, and a layer of electrically insulating material for example in form of a foil of synthetic plastic material. Such a construction may be prefabricated and mounted as a unit in the vehicle in form of a roof liner constituting a part of the vehicle roof structure. A liner constructed in this manner not only fulfills all the requirements made of the roof liner of the vehicle, but also includes a ceiling electrode for an arrangement according to my present invention. It will be appreciated that at least the uppermost layer of sound-absorbent and/or shock-absorbent electrically insulating material may be so shaped as to conform to the configuration of the underside of the vehicle roof, and in turn to conform with its own underside to the desired configuration of the ceiling of the passenger compartment, it being understood that the other two layers will in turn conform to the underside of the uppermost layer.

As far as the ceiling electrode is concerned, I have found that in one advantageous embodiment it may be provided in form of a foil-type electrode which is secured to the electrically insulating element, for instance by being sewed thereto. However, the electrode may also be provided in form of an electrically conductive layer embedded in the electrically insulating element in form of can conductive metallic material such as particles, or it may be provided of a metallized surface on the electrically insulating element, for example by vapor deposition of a metallic layer.

It will also be frequently advantageous if the electrode may at least in part be releasable from the electrically insulating element. For instance, cleaning, inspecting and/or servicing will be facilitated in this manner. For a releasable connection it is possible to use various different connecting means, including a zipper which may be provided either during the original manufacture of the vehicle including the roof structure, or which may be secured to the roof structure at a later date if the electrode is to be installed subsequent to the manufacture of the vehicle. Of course, other connecting means are also suitable including snaps of different types. Advantageously, at least a portion of the connecting means will consist of electrically conductive material and will be suitably connected with the source of electrical energy so that, when the electrode is connected with the connecting means and comes into contact with this portion of the connecting means, this portion can serve to connect the electrode to the source of electric energy.

A further embodiment of the invention envisions the use of an electrically conductive portion of the roof structure as the ceiling electrode itself, in which case such portion must be electrically insulated with reference to the remainder of the roof and the wall means. This eliminates the need for a separate ceiling electrode and does not influence the dimensions of the passenger compartment.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
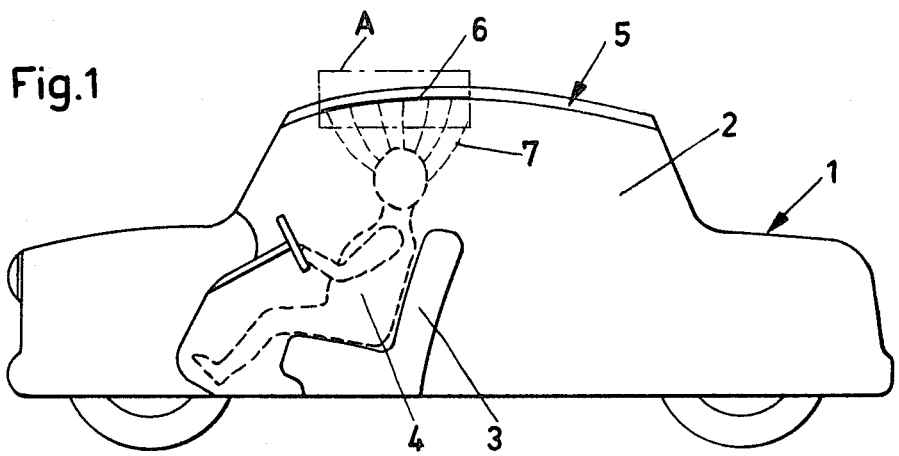
FIG. 1 is a very schematic longitudinal section through a motor vehicle embodying my invention.

Discussing now the drawing in detail, and firstly FIG. 1 thereof, it will be seen that I have indicated with reference numeral 1 a diagrammatically illustrated motor vehicle. This motor vehicle has a passenger compartment 2 provided with a seat 3 for an operator 4. The other features of such a vehicle have not been illustrated because they are conventional and would only serve to confuse the illustration.

The vehicle shown in FIG. 1 is provided with a roof structure 5 having a ceiling electrode 6 which is connected in suitable manner with the positive pole of a source of direct current of approximately 100 volts, advantageously between 90 and 150 volts. The other pole of this source is connected with the wall means and closing and defining the passenger compartment. Inasmuch as the source itself does not constitute a part of the invention I have not illustrated it because it is of course conventional. In the passenger compartment 2 an electrostatic field develops between the ceiling electrode 6 and the wall means enclosing and defining the passenger compartment 2, this wall means constituting a counterelectrode to the ceiling electrode 6. When the operator is seated in the seat 3, the electrostatic field changes because the head and the upper portion of the body of the operator 4 will be located near to the ceiling electrode 6. This results in a field strength concentration indicated by the field lines 7, and it is this field strength concentration which makes it possible to use relatively low voltages for operating the electrode 6.

The area outlined in chain lines and identified with the reference designation A in FIG. 1 indicates schematically the fragmentary longitudinal sectional view of various different embodiments shown in FIGS. 2—5.

Figures 2, 3, 6:
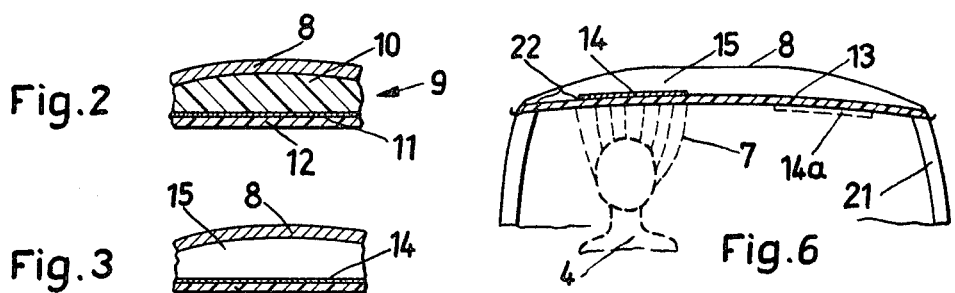
FIG. 2 is a fragmentary longitudinal section, on an enlarge scale, illustrating a first embodiment of the invention.
FIG. 3 is a view similar to FIG. 2 but illustrating a second embodiment of the invention.
FIG. 6 is a fragmentary diagrammatic transverse view through a passenger compartment of a vehicle illustrating an embodiment of the invention.

In the embodiment of FIG. 2 the metallic roof 8 has secured to its underside of roof liner 9 consisting of a layer 10 of foam plastic material, a metallic foil 11, and a foil 12 of synthetic plastic material. The layer 10 serves in conventional manner as the sound-absorbent and shock-absorbent layer of the roof liner and, in accordance with the present invention, it has electrically insulating characteristics, thus serving as an insulator for the metallic foil 11 which constitutes the ceiling electrode and is insulated from the metallic roof 8 by the layer 10. The foil 12, on the other hand, serves to conceal the electrode 11 and may be but need not be electrically insulating. The entire roof line 9 may be prefabricated and applied in toto to the underside of the roof 8, although the layers may also be applied individually. It should be pointed out that the layer 10 need not consist of foam plastic material, but may also consist of felt or may be a layer of antireverberation paste as its is also frequently used in the manufacture of vehicle roof structures. Evidently the layer 10 may itself consist of several layers if desired. The layer 12 can be replaced by a coat of lacquer or paint. The important factor is that the layer 10, which is already incorporated in roof structures of this type for other reasons, namely to serve as a sound-absorbent or shock-absorbent layer, now also acts as an electrically insulating layer and carries the ceiling electrode 11.

The embodiment of FIG. 3 differs from that of FIG. 2 in that the metallic roof of the vehicle, again identified with reference numeral 8, has mounted thereunder, spaced from its underside as shown, a roof liner consisting in this embodiment of a synthetic plastic foil 13. The foil 13 carries on its upper side, that is the one facing the underside of the roof 8, a metallic foil 14 which constitutes the ceiling electrode. The foil 13 consists of an electrically insulating material and the marginal zones of the electrode foil 14 which overlies the foil 13 are spaced so far inwardly away from any point of contact between the foil 13 and the wall means to which the foil 13 is secured so that the layer or foil 13 serves as an insulator for the electrode 14. The latter, incidentally, is of course insulated from the metallic roof 8 by the air space 15 existing between the roof 8 and the electrode 14. This air space in this embodiment should not be less than 5 mm. as measured intermediate the roof 8 and the electrode 14.

It will be appreciated that the foil 13 could also be replaced by a rigid or semirigid plate, for example with a plate consisting of wood chips or the like bound with synthetic plastic resin, or with a molded or otherwise suitably configurated synthetic plastic shell having sufficient resilience that it could be connected with a snap action with suitable connecting means provided on the walls bounding the passenger compartment.

Figures 4, 7:
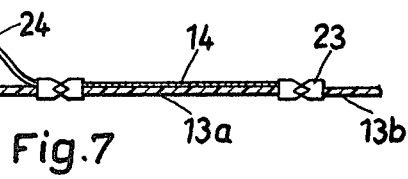
FIG. 4 is a view similar to FIG. 2 but illustrating a third embodiment of the invention.
FIG. 7 is a schematic fragmentary transverse section through a removably mounted ceiling electrode arrangement.

In the embodiment of FIG. 4 the underside of the metallic roof 8 is provided with a coat or layer of a corrosion-resisting lacquer or paint, this coat being identified with reference numeral 16. The use of such material is known in the production of vehicle roof structures; in accordance with the present invention, however, the material used for the coat 16 must have electrically insulating characteristics. Directly applied on the underside of the coating 16 is a layer 17 which in this embodiment also consists of a lacquer or paint to which metallic particles have been added so that the layer 17 is electrically conductive and constitutes the ceiling electrodes of my invention.

Figures 5, 8:
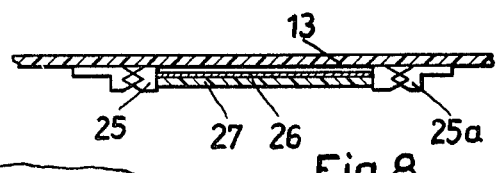
FIG. 5 is a view similar to FIG. 2 but illustrating a fourth embodiment of the invention.
FIG. 8 is a view similar to FIG. 7 but illustrating a further embodiment of the invention.

In the embodiment of FIG. 5 I have illustrated an arrangement wherein the roof 18 consists not of electrically conductive material, but rather of synthetic plastic material. Such roofs are for instance known for convertible automobiles having replaceable roofs consisting of fiberglass or the like. In any case, to the electrically nonconductive roof 18 in FIG. 5 there is connected at the underside thereof a metallic foil 19 which constitutes the ceiling electrode, and to the underside of the foil 19 there is secure a layer 20 which may be of synthetic plastic material or any other suitable material, or which may be replaced with a coat of lacquer or of paint; the layer 20 serves to optically conceal the electrode 19.

In the embodiment of FIG. 6 it is assumed that the vehicle is provided with a liner corresponding to the one illustrated in the embodiment of FIG. 3. This liner is secured laterally with its marginal portions to the vehicle, for example by having its marginal portions clamped or otherwise secured between the sidewalls 21 and the roof 8. The electrode 14 in this embodiment is so positioned as to be located approximately above the head of the vehicle operator 4 although it can of course be extended so as to be located above the head of the person sitting next to the operator 4, or above the heads of all passengers of the vehicle. In the embodiment of FIG. 6 I have illustrated in dashed lines, and identified with reference numeral 14a, the possibility of providing a second ceiling electrode above the head of a (nonillustrated) person sitting next to the operator 4.

FIG. 6 shows that the electrode 14 is so positioned on the liner 13 that it is spaced from the sidewalls 21 by a distance 22 whose width is so calculated that in connection with the insulating characteristics of the liner 13 it suffices to electrically insulate the electrode 14 with respect to the sidewalls 21 and the roof 8. Of course, the determination of the actual width of the space 22 can be readily determined by those skilled in the art. Clearly, if the liner 13 is not directly connected to the sidewalls 21 and/or the roof 8, but rather through the intermediary of connecting members which in turn consist of electrically insulating material, then the distance 22 may be narrower than if the liner 13 is directly connected to the sidewalls 21 and/or the roof 8.

The embodiment of FIG. 7 illustrates that a portion 13a of liner 13 (compare FIGS. 3 and 6) may be made separable from the rest 13b of the liner 13 and may be secured releasably to the rest 13b of the liner 13, for instance in this embodiment by means of a zipper 23. The zipper 23 may in this embodiment extent all around the margin of the portion 13a which latter carries the electrode 14 thereon and the zipper 23 will advantageously consist over at least part of its length of electrically conductive material. If the zipper 23 is then connected with a (nonillustrated) source of electrical energy as discussed above, by means of the conductor 24, connecting of the portion 13a with the portion 13b via the zipper 23, that is zipping of the portion 13a to the portion 13b will effect its automatic conductive connection with the source of electrical energy because the electrode 14 will in this case be electrically connected with the electrically conductive portion of the zipper 23. Such an arrangement is particularly advantageous for an installation of my novel arrangement in a vehicle subsequent to the manufacture of the vehicle. In other words, the vehicle can be supplied with the portion 13a and the portion 13b and the zipper 23, and it can then be supplied either by the factory or by a dealer or a mechanic with the electrode 14 whenever desired. The factory may for instance simply provide the portion 13a which is zipped to the portion 13b to close the opening in the latter, and the vehicle owner or operator may have the electrode 14 applied to the portion 13a and in conductive contact with the conductive portion of the zipper 23 at a later date. Another advantage of this construction is the fact that on removal of the portion 13a and the electrode 14 the latter and the marginal zones of the portion 13b bounding the opening in the portion 13b can be readily cleaned of dust so as to eliminate the possibility that such dust or dirt might cause short circuiting.

The embodiment of FIG. 8 is a modification of the embodiment shown in FIG. 7. In FIG. 8 the liner 13 is shown to be uninterrupted unlike the embodiment shown in FIG. 7. However, in FIG. 8 a zipper 25 is secured to the liner 13 at the underside thereof, that is the side facing the interior of the passenger compartment, and an electrically insulating foil or layer 27 carrying on its upper side an electrically conductive foil 26, constituting the ceiling electrode, is connected to the liner 13 by the zipper 25. This arrangement can be incorporated into the vehicle at a date subsequent to the manufacture of the vehicle simply by securing the portion 25a of the zipper to the liner 13, and then effecting a connection with the portion 25a.

Figure 9:
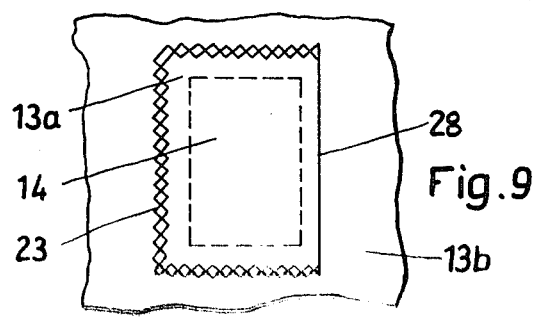
FIG. 9 is a bottom plan view of a partially removable ceiling electrode arrangement.
Figure 10:
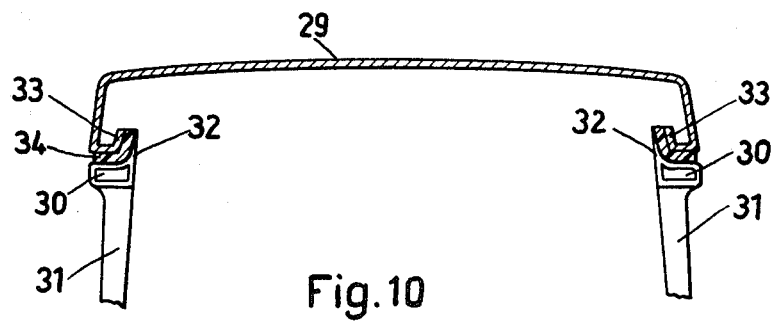
FIG. 10 is a schematic transverse section through the roof structure of a vehicle incorporating one embodiment of my invention.

The embodiment in FIG. 9 is also somewhat reminiscent of the embodiment of FIG. 7. Here, the portion 13a carrying the electrode 14 is not completely removable from the portion 13b of the liner 13, as in FIG. 7, but rather it is firmly connected or of one piece with the portion 13b along the line 28. The remaining three sides bounding the portion 13a are, however, severed from the portion 13b and connectable thereto by means of a zipper 23. The zipper can then be opened and the portion 13a with the electrode 14 lowered in the manner of a flap to thereby gain access to the upper side of the liner 13 for cleaning purposes. This construction may also be utilized in the embodiment of FIG. 8 in analogous manner. In the embodiment of FIG. 10 I have illustrated a construction where the ceiling electrode is constituted by the metallic roof 29 of the passenger compartment. In this embodiment the roof 29 rests on the beams or profiles 30 which are supported by the uprights 31. Abutments 32 cooperate with the flanges 33 to maintain the roof 29 in place. A layer 34 consisting of insulating material, that is electrcially insulating material, is interposed between the adjacent surface portion of the roof 29 and the beams 30. This layer may be an adhesive material serving at the same time to connect the roof 29 with the beams 30. In this particular construction the entire area of the roof 29 may be connected with the positive pole of the source of direct current, thus providing a ceiling electrode having a very large surface expanse.

Figure 11:
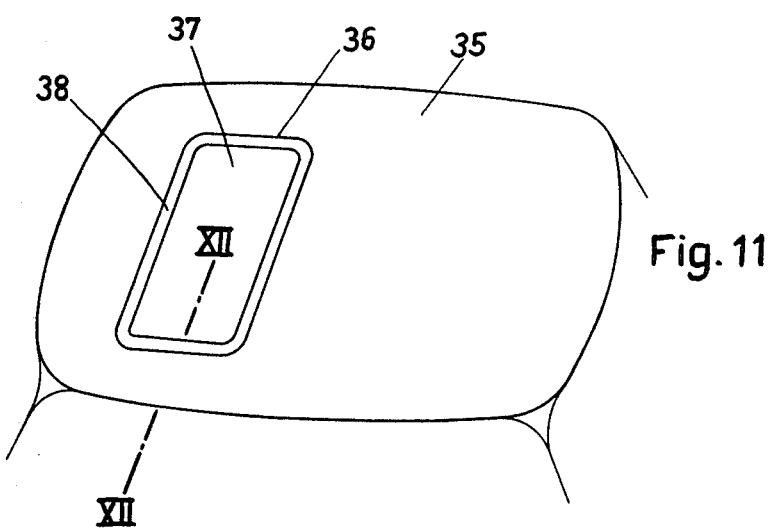
FIG. 11 is a top plan view of a vehicle roof incorporating a further embodiment of my invention.

The embodiment of FIG. 11 illustrates a construction wherein the metallic roof 35 is provided with a cutout 36. A metallic or electrically conductive plate 37 which constitutes the ceiling electrode, is located in the cutout 36 and has its marginal zone 40 electrically insulated from the marginal zone 39 of the metallic roof 35 by a gasket 38 consisting of electrically insulating material. The embodiment of FIG. 11 is so constructed, as clearly shown in FIG. 12, that the upper surface of the plate 37 is substantially flush with the remainder of the roof 35, that is with the upper surface of the roof 35. This is accomplished in the manner shown in FIG. 12 by downwardly recessing the marginal zone 39 bounding the cutout 36 in the roof 35, and having the marginal zone 40 of the plate 37 overlap the marginal zone 39 with the gasket 38 being interposed between the two.

Figure 12:
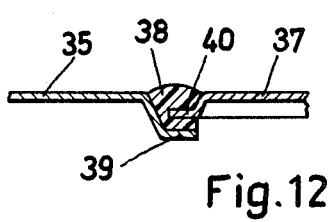
FIG. 12 is a section taken on the line XII–XII in FIG. 11.
Figure 13:
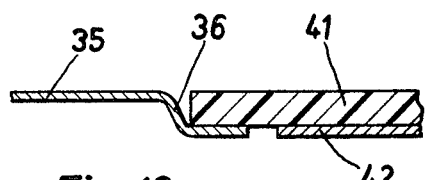
FIG. 13 is a view similar to FIG. 12 but illustrating a modified further embodiment of the invention.

Coming, finally, to the embodiment shown in FIG. 13 it will be seen that this is reminiscent of the one shown in FIGS. 11 and 12. It differs from that embodiment in that the plate 37 is replaced with a plate 41 consisting of electrically insulating material, for instance synthetic plastic material, which is located in the cutout 36 of the roof 35 and suitably secured to the latter. In this embodiment, the underside of the plate 41, that is the one facing towards the passenger compartment, then carries a foil, a coating, or generally a layer of electrically conductive characteristics and identified with reference numeral 42; this layer 42 then constitutes the ceiling electrode which may of course be covered on its underside with a coat or layer of suitable material in order to conceal it from view.

It will be appreciated that in all of the embodiments herein discussed by way of example it is not necessary that the counterelectrode to the ceiling electrode be constituted by the walls of the passenger compartment. Instead, it is possible to provide individual electrodes located on or in the region of the floor of the passenger compartment, just as it is possible to make the surfaces of elements with which the person or persons to be subjected to the electrostatic field come in contact, of electrically conductive material and to connect them to mass. Such surfaces may be the surfaces of seat covers, of floor mats or the like, and these will then constitute the counterelectrode or electrodes.

It will be understood that each of the elements described above, or two or more together, may also find a useful application in other types of constructions differing from the types described above.

While the invention has been illustrated and described as embodied in an electrostatic arrangement in passenger conveyances, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desired to be protected by Letters Patent is set forth in the appended;

1. In a passenger conveyance of the type having wall means enclosing and defining a passenger compartment provided with a roof structure, at least part of said wall means being electrically conductive, an arrangement for establishing within the passenger compartment an electrostatic field, said arrangement comprising first electrode means remote from said roof structure, second electrode means, including an electrically conductive element and an electrically insulating element insulating said electrically conductive element from the electrically conductive part of said wall means, at least one of said elements constituting at least a portion of said roof structure, and a source of electrical energy having two poles of opposite polarity respectively connected to said first electrode means and to said electrically conductive element of said second electrode means.

2. In a passenger conveyance as defined in claim 1, wherein said one element is said electrically insulating element, said electrically conductive element being carried by said one element.

3. In a passenger conveyance as defined in claim 1, said roof structure including a plurality of components at least one of which is electrically conductive and in conductive contact with the remainder of said wall means, and at least one other of which is electrically insulating, said electrically insulating element constituting at least a portion of said other component and insulating said electrically conductive element from said electrically conductive component and from the remainder of said wall means.

4. In a passenger conveyance as defined in claim 1, said roof structure including an electrically conductive roof and an electrically insulating line constituting said one element mounted below and spaced from said roof, and said electrically conductive element being provided on and carried by said liner.

5. In a passenger conveyance as defined in claim 4, said electrically conductive element being provided on a side of said liner facing said roof.

6. In a passenger conveyance as defined in claim 1, wherein said electrically conductive element is a foil overlying and carried by said electrically insulating element.

7. In a passenger conveyance as defined in claim 1, said electrically insulating element constituting said one element, and said electrically conductive element being an electrically conductive layer embedded in said electrically insulating element.

8. In a passenger conveyance as defined in claim 1, said electrically insulating element constituting said one element, and said electrically conductive element being a metallized portion of said electrically insulating element.

9. In a passenger conveyance as defined in claim 1, said electrically conductive element being at least in part removably connected with said electrically insulating element.

10. In a passenger conveyance as defined in claim 9; further comprising connecting means for releasably connecting said electrically conductive element with said electrically insulating element.

11. In a passenger conveyance as defined in claim 10, wherein said connecting means comprises zipper means.

12. In a passenger conveyance as defined in claim 10, wherein said connecting means consists at least in part of electrically conductive material in contact with said electrically conductive element for placing the latter in conductive contact with a source of electric energy through the intermediary of said connecting means.

13. In a passenger conveyance as defined in claim 1, said electrically insulating element consisting of a synthetic plastic material resistant to electrostatic charging.

14. In a passenger conveyance as defined in claim 1, said source being a source of direct current having a voltage output of substantially 100 v., and said electrically conductive element being conductively connected with the positive pole of said source.

15. In a passenger conveyance as defined in claim 1, said roof structure including an electrically conductive roof, and said electrically conductive element constituting a discrete portion of said roof; and further comprising insulating means electrically insulating said discrete portion from the remainder of said roof.

16. In a passenger conveyance as defined in claim 1, said roof being provided with an opening and said electrically conductive insert being configurated as a plate dimensioned to substantially fill said opening, said plate being received in said opening closing the same and said insulating means being interposed between said plate and adjoining portions of said roof and insulating said plate from said roof.

17. In a passenger conveyance as defined in claim 4, wherein said liner consists of at least one shell of electrically insulating synthetic plastic material, said shell being resiliently deformable; and cooperating engaging means on said roof structure and said shell for connecting the latter to the former with a snap action.